United States Patent
Bang

(10) Patent No.: US 7,855,014 B2
(45) Date of Patent: *Dec. 21, 2010

(54) SECONDARY BATTERY

(75) Inventor: Sun-Hee Bang, Busan-Si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1268 days.

This patent is subject to a terminal disclaimer.

(21) Appl. No.: 11/188,213

(22) Filed: Jul. 25, 2005

(65) Prior Publication Data

US 2006/0057457 A1     Mar. 16, 2006

(30) Foreign Application Priority Data

Jul. 30, 2004    (KR) .................. 10-2004-0060085

(51) Int. Cl.
  *H01M 2/06*    (2006.01)
  *H01M 2/26*    (2006.01)
(52) U.S. Cl. ...................... 429/178; 429/181
(58) Field of Classification Search ........................ None
  See application file for complete search history.

(56) References Cited

U.S. PATENT DOCUMENTS

| 2002/0034680 A1* | 3/2002 | Inoue et al. .................. 429/94 |
| 2004/0126651 A1* | 7/2004 | Kim et al. .................... 429/61 |
| 2006/0040179 A1* | 2/2006 | Bang ........................ 429/178 |
| 2007/0026302 A1  | 2/2007 | Yoon |
| 2007/0154796 A1  | 7/2007 | Uh |
| 2007/0154798 A1  | 7/2007 | Jung |

FOREIGN PATENT DOCUMENTS

| CN | 1366359 A     | 8/2002 |
| JP | 54-82339 A    | 6/1979 |
| JP | 10-003900 A   | 1/1998 |
| JP | H11-245043 A  | 9/1999 |
| JP | 2000-106170 A | 4/2000 |
| JP | 2002-008623   | 1/2002 |
| JP | 2002008623 A *| 1/2002 |
| JP | 2002-216739 A | 8/2002 |
| JP | 2003-151527 A | 5/2003 |
| JP | 2003-217562 A | 7/2003 |
| KR | 1020030066243 | 8/2003 |

OTHER PUBLICATIONS

IPDL JPO Machine Translation for JP 2002008623 A (Higo et al.) Jan. 2002.*
U.S. Appl. No. 11/188,209, filed Jul. 25, 2005, Sun-Hee Bang.
emboss definition-Dictionary-MSN Encarla: http://encarta.msn.com/encnet/features/dictionary.
emboss-Dictionary definition and pronunciation-Yahoo! Education http://education.yahoo.com/reference/dictionary/entry/emboss.
Principal Metals: http://www.principalmetal.com/glossary/edoc.htm.

* cited by examiner

*Primary Examiner*—Dah-Wei D Yuan
*Assistant Examiner*—Adam A Arciero
(74) *Attorney, Agent, or Firm*—Robert E. Bushnell, Esq.

(57) ABSTRACT

A secondary battery has a protrusion formed on a first electrode tab welded to a terminal plate of a cap assembly to increase the contact resistance between the first electrode tab and the terminal plate for easy welding.

20 Claims, 6 Drawing Sheets

SECONDARY BATTERY

CLAIM OF PRIORITY

This application makes reference to, incorporates the same herein, and claims all benefits accruing under 35 U.S.C. §119 from my application for SECONDARY BATTERY earlier filed in the Korean Intellectual Property Office on 30 Jul. 2004 and there duly assigned Serial No. 2004-60085.

CROSS-REFERENCE TO RELATED APPLICATIONS

Furthermore, the present application is related to a co-pending U.S. application Ser. No. 11/188,209, entitled SECONDARY BATTERY, based upon three Korean patent applications, Serial Nos. 2004-60084, 2004-60086 and 2004-60087, all of which were filed in the Korean Intellectual Property Office on 30 Jul. 2004, and filed in the U.S. Patent & Trademark Office concurrently with the present application on 25 Jul. 2005.

BACKGROUND OF THE INVENTION

1. Field of the Invention

The present invention relates to a secondary battery, and more particularly to a secondary battery having a protrusion formed on a first electrode tab welded to a terminal plate of a cap assembly to increase the contact resistance between the first electrode tab and the terminal plate for easy welding.

2. Description of the Related Art

As portable wireless appliances including video cameras, portable telephones, and portable computers tend to have reduced weight while incorporating more functions, much research has been conducted on secondary batteries which are used as the driving power source thereof. For example, secondary batteries include nickel cadmium batteries, nickel hydrogen batteries, nickel zinc batteries, and lithium secondary batteries. Among them, lithium secondary batteries are widely used in the cutting-edge electronic appliance field because they can be recharged, they can be made in a compact size while having larger capacity, and they have high operating voltage and high energy density per unit weight.

A can-type secondary battery is formed by placing an electrode assembly, composed of first and secondary electrode plates and a separator, into a can together with an electrode and sealing a top opening of the can with a cap assembly.

The electrode assembly is wound while the separator is interposed between the first and second electrode plates. The second electrode plate has a second electrode tab protruding from an upper end of the electrode assembly. The first electrode plate has a first electrode tab protruding from the upper end of the electrode assembly. The first and second electrode tabs are generally of a nickel-based metal.

The cap assembly includes a cap plate, an insulation plate, a terminal plate, and an electrode terminal. After being attached to a separate insulation case, the cap assembly is attached to the top opening of the can and seals the can.

The cap plate is of a metal plate having a size and a shape corresponding to the top opening of the can. The cap plate has a first terminal through-hole formed at the center thereof, into which the electrode terminal is inserted. When the electrode terminal is inserted into the first terminal through-hole, a tubular gasket is attached to the outer surface of the electrode terminal and is inserted together, in order to insulate the electrode terminal and the cap plate from each other. The cap plate an electrolyte injection hole formed on a side thereof. After the cap assembly is attached to the top opening of the can, an electrolyte is injected through the electrolyte injection hole, which is then sealed by a separate sealing means.

The electrode terminal is connected to the first electrode tab of the first electrode plate or to the second electrode tab of the second electrode plate and acts as a negative or positive terminal.

The insulation plate is of an insulation material and is attached to the lower surface of the cap plate. The insulation plate has a second terminal through-hole formed thereon, which is positioned to correspond to the first terminal through-hole of the cap plate 140, so that the electrode terminal can be inserted therein.

The terminal plate is of a nickel-steel alloy (36.5% of Ni and 63.5% of Fe), which is a nickel-based alloy, and is attached to the lower surface of the insulation plate. The terminal plate has a third terminal through-hole formed thereon, which is positioned to correspond to the first terminal through-hole of the cap plate, so that the electrode terminal can be inserted therein. The terminal plate is electrically connected the electrode terminal while being insulated from the cap plate, the electrode terminal being insulated by the gasket tube 146 as it extends through the first terminal through-hole of the cap plate.

The first electrode tab, which is attached to the first electrode plate, is welded to a side of the terminal plate and the second electrode tab, which is attached to the second electrode plate, is welded to the other side thereof. The first and second electrode tabs can be attached by resistance welding or laser welding. However, resistance welding is preferred.

According to a recent method for reducing the internal resistance of secondary batteries, each component is of a metal having a low electrical resistance. In other words, the internal resistance of secondary batteries is reduced to avoid electrical loss within the batteries. Although the terminal plate is typically of a nickel-steel alloy which has a high resistance, it is replaced by a nickel-based metal which has a low resistance to avoid electrical losses caused by the high resistance.

When the terminal plate is of a nickel-based metal, however, the contact resistance between the terminal plate and the first electrode tab decreases and it becomes difficult to weld the first electrode tab. As such, the weldability between the terminal plate and the first electrode tab deteriorates and the welding tends to occur between the first electrode tab and the welding rod.

Such a problem can occur in the case of pouch-type batteries, as well as in the case of can-type secondary batteries.

SUMMARY OF THE INVENTION

Accordingly, the present invention has been made to solve the above-mentioned problems, and it is therefore an object of the present invention is to provide a secondary battery having a protrusion formed on a first electrode tab welded to a terminal plate of a cap assembly to increase the contact resistance between the first electrode tab and the terminal plate for easy welding.

In order to accomplish this object, a secondary battery is provided comprising: an electrode assembly having first and second electrode plates, a separator, and first and second electrode tabs respectively attached to the first and second electrode plates; and a cap assembly having a cap plate, an electrode terminal, and a terminal plate; the first electrode tab has at least one protrusion arranged on a portion thereof contacting the terminal plate to facilitate welding the at least one protrusion to the terminal plate.

The first electrode plate preferably comprises a negative electrode plate and the first electrode tab comprises a negative electrode tab. The first electrode tab preferably comprises two protrusions arranged thereon.

The at least one protrusion preferably comprises an embossing impressed from the rear surface of the terminal plate.

The embossing preferably comprises a circular, an elliptical, or a polygonal shape. The embossing is preferably smaller than a welding nugget. The embossing is preferably smaller than 30% of the width of the first electrode tab. The embossing is preferably smaller than 20% of the width of the electrode tab. The embossing preferably has a width of 1.0 mm or less. The embossing preferably has a thickness equal to at least 90% of the thickness of the electrode tab.

Each embossing is preferably spaced apart from each other by a distance equal to at least the size of the embossing. Each embossing is preferably spaced apart from each other by at least 1.0 mm. The embossings are preferably arranged linearly or in a matrix shape.

The protrusion preferably comprises a conductive tip attached to the front surface of the first electrode tab. The conductive tip preferably comprises a metal having a higher electrical resistance than that of a nickel-based metal. The conductive tip preferably comprises a nickel-steel alloy. The conductive tip has a width of 1.0 mm or less.

The protrusion preferably comprises a conductive embossing plate. The embossing plate preferably comprises a metal having a higher electrical resistance than that of a nickel-based metal. The embossing plate preferably comprises a nickel-steel alloy. The embossing of the embossing plate preferably has a diameter of 1.0 mm or less and each embossing is preferably spaced apart from each other at least 1.0 mm.

The second electrode plate preferably comprises a positive electrode plate and the second electrode tab preferably comprises a positive electrode tab and has at least one second protrusion arranged on a portion thereof contacting the cap plate.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein:

FIG. 3b is a sectional view taken along line A-A of FIG. 3a;

FIG. 5b is a sectional view taken along line B-B of FIG. 5a;

FIG. 6b is a sectional view taken along line C-C of FIG. 6a; and

DETAILED DESCRIPTION OF THE INVENTION

Figure 1:
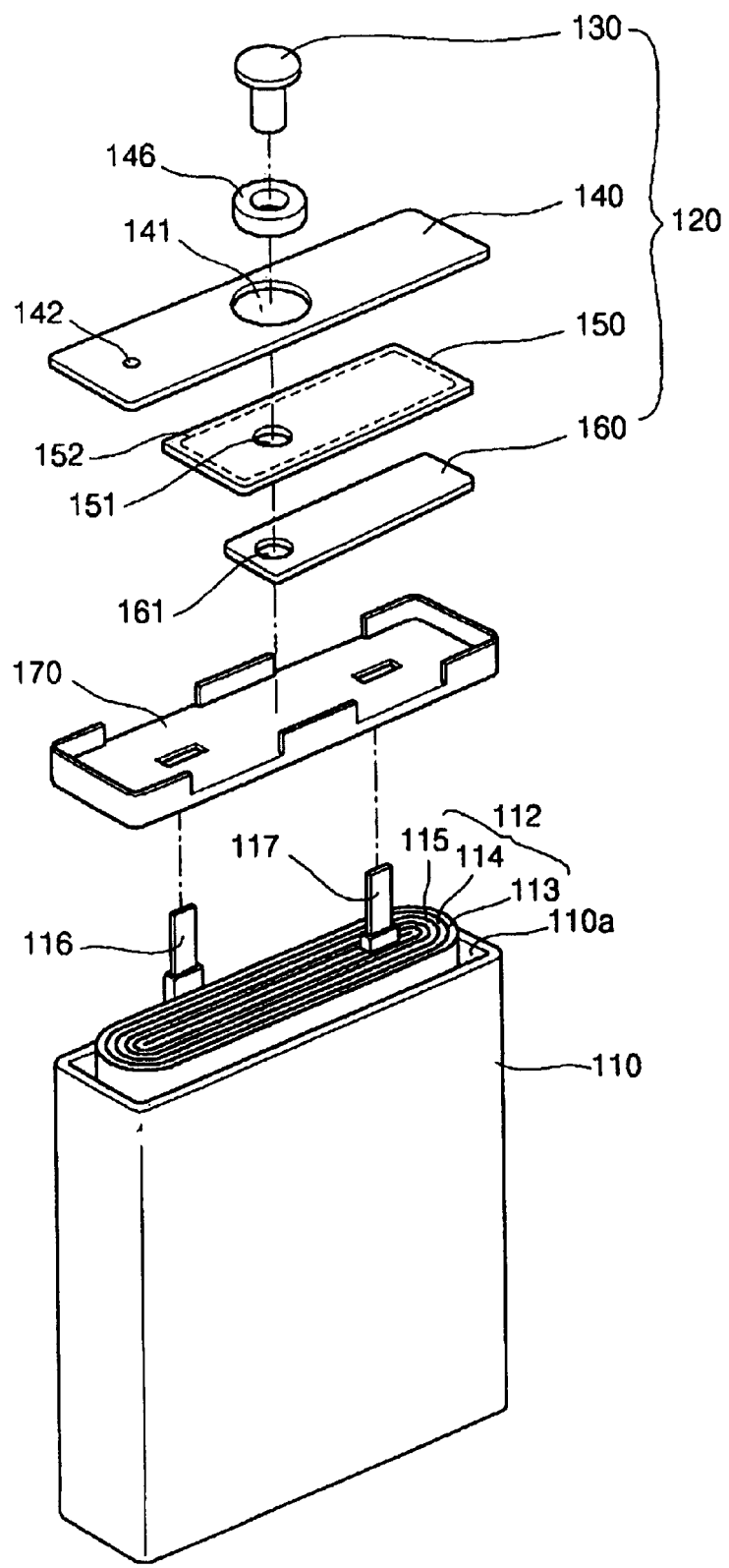
FIG. 1 is an exploded perspective view of a secondary battery.

FIG. 1 is an exploded perspective view of a secondary battery. The can-type secondary battery is formed by placing an electrode assembly 112, composed of first and secondary electrode plates 15 and 113 and a separator 114, into a can 110 together with an electrode and sealing a top opening 110a of the can 110 with a cap assembly 120.

The electrode assembly 112 is wound while the separator 114 is interposed between the first and second electrode plates 15 and 113. The second electrode plate 113 has a second electrode tab 116 protruding from an upper end of the electrode assembly 112. The first electrode plate 115 has a first electrode tab 117 protruding from the upper end of the electrode assembly 112. The first and second electrode tabs 117 and 116 are generally of a nickel-based metal.

The cap assembly 120 includes a cap plate 140, an insulation plate 150, a terminal plate 160, and an electrode terminal 130. After being attached to a separate insulation case 170, the cap assembly 120 is attached to the top opening 110a of the can and seals the can 110.

The cap plate 140 is of a metal plate having a size and a shape corresponding to the top opening 110a of the can 110. The cap plate 140 has a first terminal through-hole 141 formed at the center thereof, into which the electrode terminal 130 is inserted. When the electrode terminal 130 is inserted into the first terminal through-hole 141, a tubular gasket 146 is attached to the outer surface of the electrode terminal 130 and is inserted together, in order to insulate the electrode terminal 130 and the cap plate 140 from each other. The cap plate 140 has an electrolyte injection hole 142 formed on a side thereof. After the cap assembly 120 is attached to the top opening 110a of the can 110, an electrolyte is injected through the electrolyte injection hole 142, which is then sealed by a separate sealing means.

The electrode terminal 130 is connected to the first electrode tab 117 of the first electrode plate 115 or to the second electrode tab 116 of the second electrode plate 113 and acts as a negative or positive terminal.

The insulation plate 150 is of an insulation material and is attached to the lower surface of the cap plate 140. The insulation plate 150 has a second terminal through-hole 151 formed thereon, which is positioned to correspond to the first terminal through-hole 141 of the cap plate 140, so that the electrode terminal 130 can be inserted therein.

The terminal plate 160 is of a nickel-steel alloy (36.5% of Ni and 63.5% of Fe), which is a nickel-based alloy, and is attached to the lower surface of the insulation plate 150. The terminal plate 160 has a third terminal through-hole 161 formed thereon, which is positioned to correspond to the first terminal through-hole 141 of the cap plate 140, so that the electrode terminal 130 can be inserted therein. The terminal plate 160 is electrically connected the electrode terminal 130 while being insulated from the cap plate 140, the electrode terminal 130 being insulated by the gasket tube 146 as it extends through the first terminal through-hole 141 of the cap plate 140.

The first electrode tab 117, which is attached to the first electrode plate 115, is welded to a side of the terminal plate 160 and the second electrode tab 116, which is attached to the second electrode plate 113, is welded to the other side thereof. The first and second electrode tabs 117 and 116 can be attached by resistance welding or laser welding. However, resistance welding is preferred.

Hereinafter, exemplary embodiments of the present invention are described with reference to the accompanying drawings. In the following description and drawings, the same reference numerals are used to designate the same or similar components, and a repetition of the description of the same or similar components has been omitted.

Figure 2:
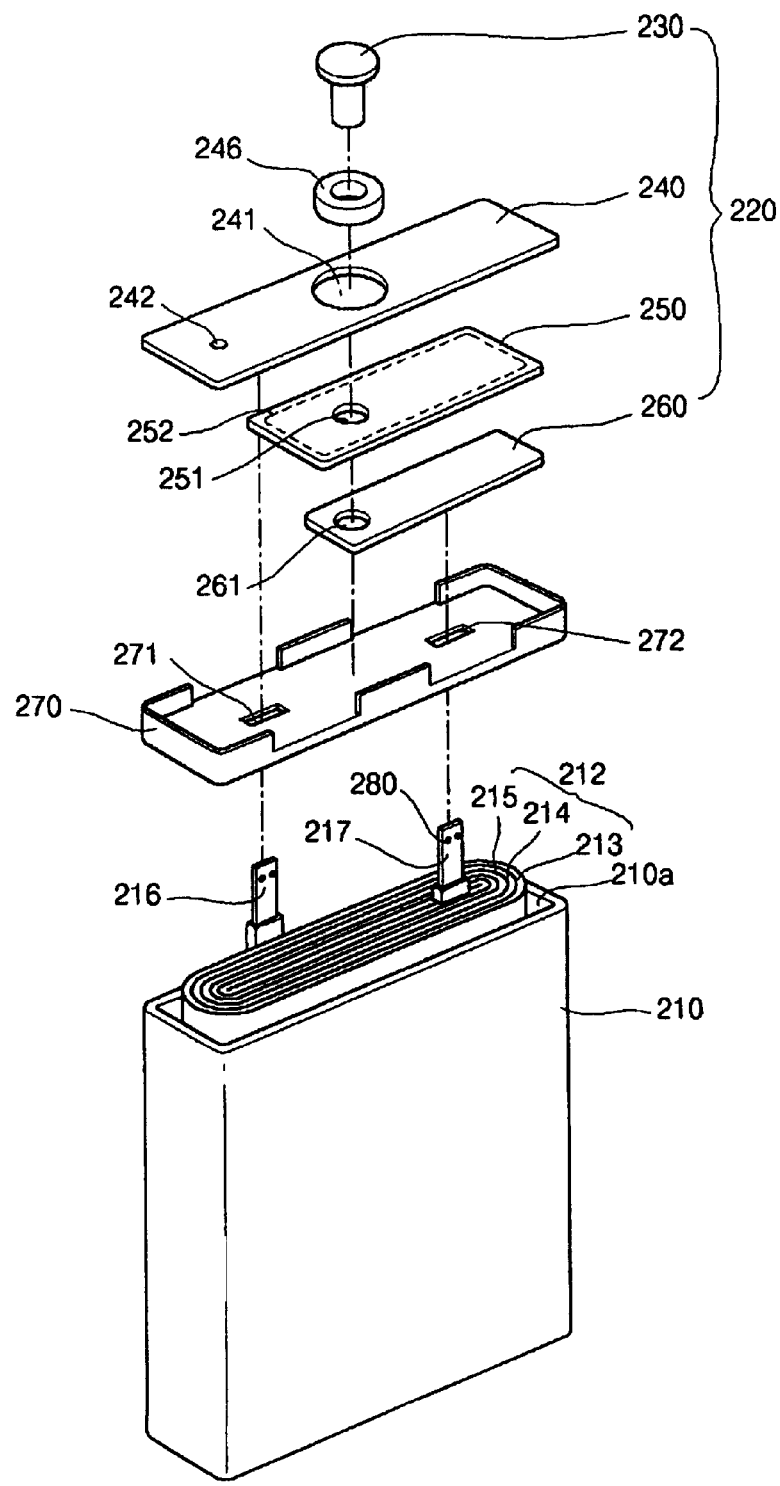
FIG. 2 is an exploded perspective view of a secondary battery according to an embodiment of the present invention.
Figure 3A:
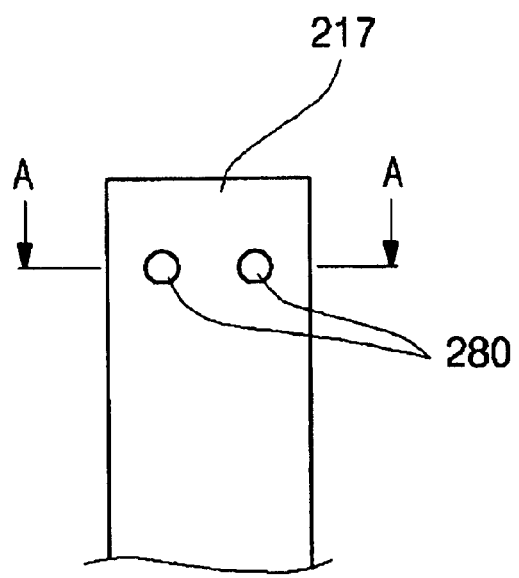
FIG. 3a is a front view of a first electrode tab according to an embodiment of the present invention.
Figure 3B:
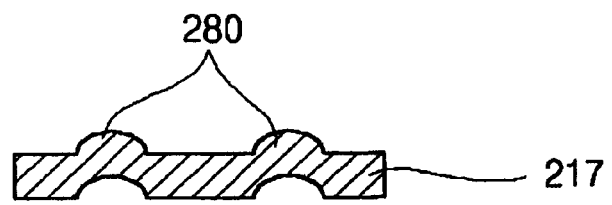
Figure 4:
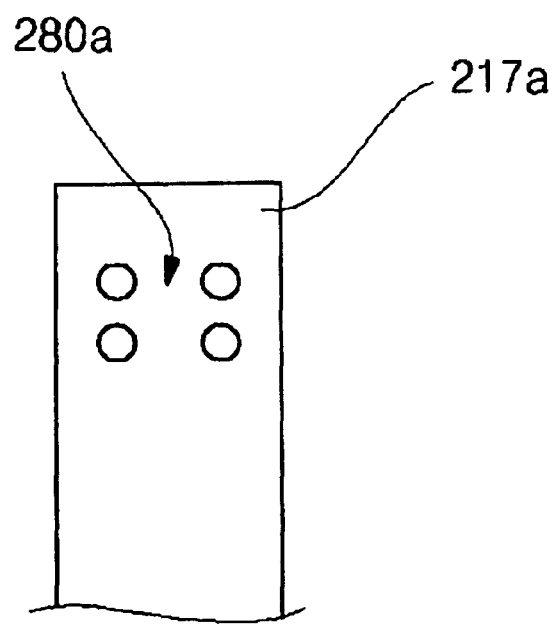
FIG. 4 is a bottom view of a first electrode tab according to another embodiment of the present invention.
Figure 5A:
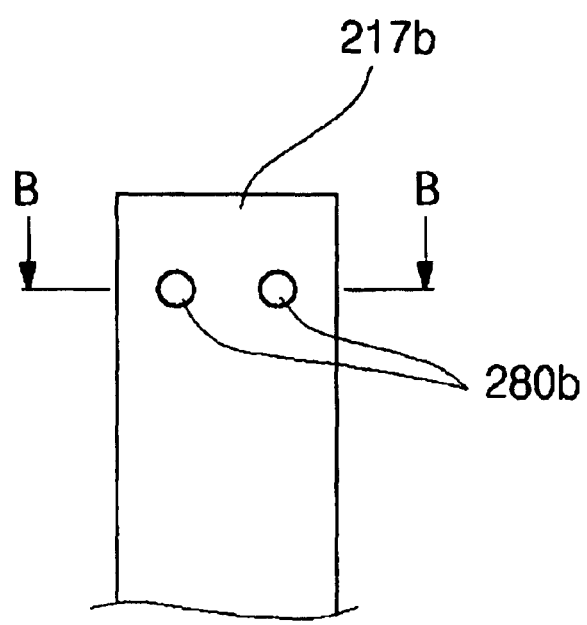
FIG. 5a is a bottom view of a first electrode tab according to another embodiment of the present invention.
Figure 5B:
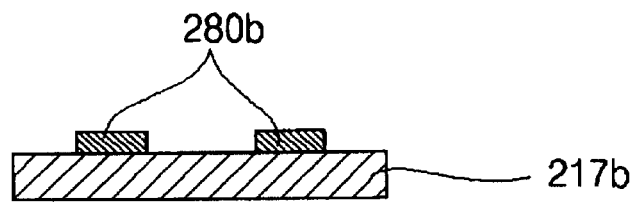
Figure 6A:
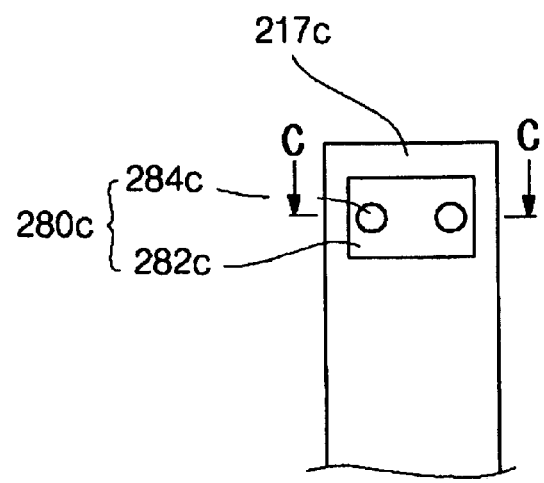
FIG. 6a is a bottom view of a first electrode tab according to another embodiment of the present invention.
Figure 6B:
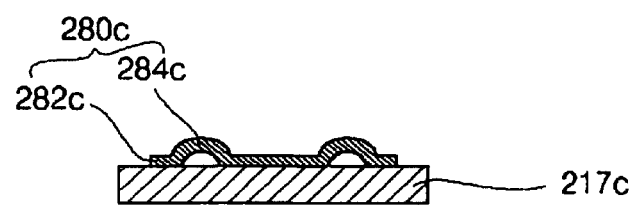
Figure 7:
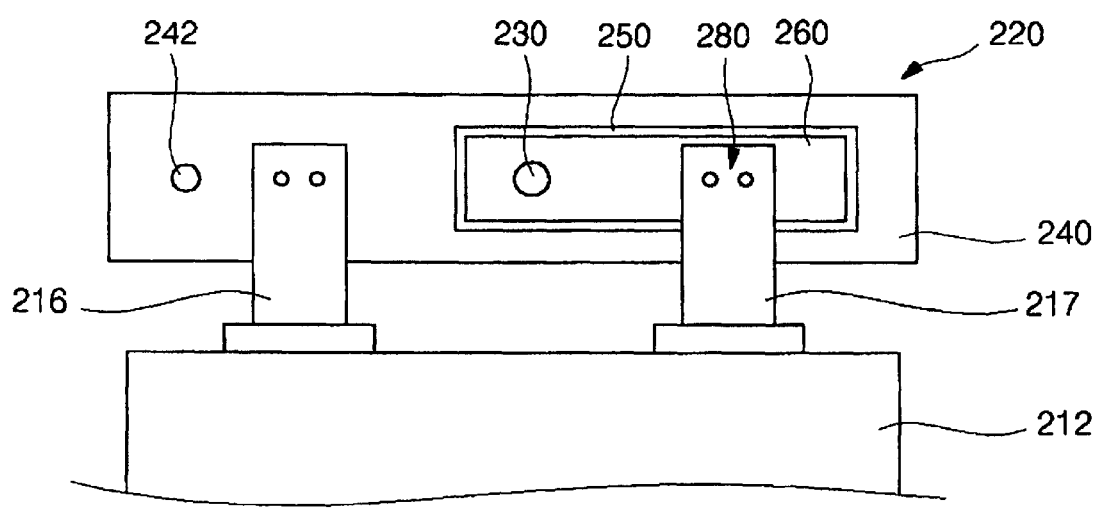
FIG. 7 is an assembled front view of a terminal plate and a first electrode tab according to an embodiment of the present invention.

FIG. 2 is an exploded perspective view of a secondary battery according to an embodiment of the present invention. FIG. 3a is a front view of a first electrode tab according to an embodiment of the present invention. FIG. 3b is a sectional view taken along line A-A of FIG. 3a. FIG. 4 is a bottom view of a first electrode tab according to another embodiment of the present invention. FIG. 5a is a bottom view of a first electrode tab according to another embodiment of the present invention. FIG. 5b is a sectional view taken along line B-B of FIG. 5a. FIG. 6a is a bottom view of a first electrode tab according to another embodiment of the present invention. FIG. 6b is a sectional view taken along line C-C of FIG. 6a. FIG. 7 is an assembled front view of a terminal plate and a first electrode tab according to an embodiment of the present invention.

Referring to FIG. 2, a secondary battery according to the present invention includes a can 210, an electrode assembly 212 contained in the can 210, and a cap assembly 220 for sealing a top opening 210a of the can 210.

The can 210 is a box shaped metallic member. The can 210 is preferably of aluminum or an aluminum alloy, which is light and ductile. However, the present invention is not limited thereto. The can 210 has a top opening 210a with an open surface and the electrode assembly 212 is placed into the can 210 through the top opening 210a.

The electrode assembly 212 includes a second electrode plate 213, a first electrode plate 215, and a separator 204. The second and first electrode plates 213 and 215 can be laminated with the separator 214 interposed between them and wound into a jelly roll. A second electrode tab 216 is welded to the second electrode plate 213 so that an end of the second electrode tab 216 protrudes from the top of the electrode assembly 212. A first electrode tab 217 is welded to the first electrode plate 215 so that an end of the first electrode tab 217 protrudes from the top of the electrode assembly 212.

The cap assembly 220 includes a cap plate 240, an insulation plate 250, a terminal plate 260, and an electrode terminal 230. The cap assembly 220 is attached to the top opening 210a of the can 210, while being insulated from the electrode assembly 212 by a separate insulation case 270, and seals the can 210.

The second electrode tab 216 is connected to the cap plate 240 through a second electrode tab hole 271 and the first electrode tab 217 is connected to the terminal plate 260 through a first electrode tab hole 272.

It is obvious to those skilled in the art that, if necessary, the first and second electrode plates 215 and 213 and the first and second electrode tabs 217 and 216 can be switched respectively.

The can plate 240 is a metal plate having a size and a shape corresponding to the top opening 210a of the can 210. The cap plate 240 is preferably of aluminum or an aluminum alloy. The cap plate 240 has a fourth terminal through-hole 241 formed at the center thereof and an electrolyte injection hole 242 positioned on a side thereof. The electrode terminal 230 is inserted into the fourth terminal through-hole 241. The fourth terminal through-hole 241 has a tubular gasket 246 attached to the inner surface thereof to insulate the electrode terminal 230 and the cap plate 240 from each other.

After the cap assembly 220 is attached to the top opening 210a of the can 210, an electrolyte is injected through the electrolyte injection hole 242, which is then sealed by a separate sealing means.

The insulation plate 250 is of an insulation material and has a seating groove 252 formed on the lower surface thereof, on which the terminal plate 260 is seated. The insulation plate 250 has a fifth terminal through-hole 251 formed on a side thereof, which is positioned to correspond to the fourth terminal through-hole 241 of the cap plate 240, so that the electrode terminal 230 can be inserted therein.

The terminal plate 260 is of a nickel-based metal and is attached to the seating groove 252 of the insulation plate 250. The terminal plate 260 has a sixth terminal through-hole 261 formed on a side thereof, which is positioned to correspond to the fourth terminal through-hole 241 of the cap plate 240, so that the electrode terminal 230 can be inserted therein.

The first electrode tab 217 is welded to the terminal plate 260 for an electrical connection, preferably by resistance welding.

Referring to FIGS. 3a and 3b, the first electrode tab 217 has a protrusion 280 formed on a surface thereof which contacts the terminal plate 260. The protrusion 280 includes at least one embossing formed by impressing the rear surface of the first electrode tab. Preferably, at least two embossings are formed and arranged linearly. It is preferable to form two embossings because two welding electrode rods are used during resistance welding of the first electrode tab 217 to the terminal plate 260. The protrusion 280 can include an embossing having a shape of a circle, an ellipse, or a polygon. However, the present invention is not limited thereto. The protrusion 280 preferably has a width of 1.0 mm or less. By using a nickel-based metal having low electrical resistance for the terminal plate 260, as mentioned above, a low electrical resistance occurs during resistance welding of the first electrode tab 217 to the terminal plate 260 and the welding is not easy. The protrusion 280 reduces the contact area between the terminal plate 260 and the first electrode tab 217 to increase the electrical resistance therebetween and make resistance welding easier. Accordingly, the protrusion 280 preferably has a size which is smaller than that of a welding nugget formed during the resistance welding.

The protrusion 280 preferably has a width of 1.0 mm or less, in order to reduce the contact area between the terminal plate 260 and the first electrode tab 217, because the diameter of a welding rod commonly used for the resistance welding and that of the welded portion is at least 1.0 mm. The protrusion 280 has a size which is smaller than 30% of the width of the first electrode tab 217, and preferably smaller than 20% of the width of the first electrode tab 217. Since at least one (and preferably at least two) embossings are formed, the embossings must have a size which is smaller than 30% of the width of the first electrode tab 217. The protrusion 280 preferably has a size which is smaller than 20% of the width of the first electrode tab 217, because a predetermined space needs to be formed between both lateral ends of the first electrode tab 217 and the protrusion 280 when the protrusion 280 is formed on the first electrode tab 217.

The protrusion 280 is formed so that the thickness of the embossing region corresponds to at least 90% of the thickness of the first electrode tab 217. If the embossing is too thin, the embossing region can fracture during welding and can separate from the first electrode tab 217.

When at least two embossings are formed as the protrusion 280, the embossings are spaced apart from each other by a distance which corresponds to at least the size of the embossing. If the spacing between each embossing of the protrusion 280 is too small, there is a problem in that the contact area between the protrusion 280 and the terminal plate 260 increases. As such, the spacing between each embossing of the protrusion 280 should be at least 1 mm. The spacing between each protrusion 280 is preferably at least 1 mm, because the first electrode tab 217 is welded to the terminal plate 260 on two spots and the diameter of the welded portion is at least 1.0 mm.

FIG. 4 is a front view of a first electrode tab according to another embodiment of the present invention.

Referring to FIG. 4, the protrusions 280a formed on the first electrode tab 217a include a number of embossings formed in a matrix shape. Specifically, the protrusions 280a are embossings arranged in at least two columns and rows. When the embossings are formed in a matrix shape, the first electrode tab 217 can be welded to a larger region and the welding process can be performed more easily. The embossings of the protrusions 280a preferably have a width of 1.0 mm or less.

FIGS. 5a and 5b are front and sectional views of a first electrode tab according to another embodiment of the present invention.

Referring to FIGS. 5a and 5b, the first electrode tab 217b has protrusions 280b formed thereon by attaching at least two conductive tips linearly or in a matrix array. The conductive tips 280b are of conductive bodies having the shape of a plate, a sphere, or an elliptical sphere and preferably have a width of 1.0 mm or less. The conductive tips 280b are attached to the first electrode tab 217b by pressing, welding, or soldering. The conductive tips 280b are preferably of a metal, such as a nickel-steel alloy, having a higher electrical resistance than a nickel-based metal. However, the type of metal is not limited thereto. When the conductive tips 280b are of a metal having a higher electrical resistance than the nickel-based metal which constitutes the terminal plate 260, the contact resistance further increases when the conductive tips 280b and the terminal plate 260 contact each other. This improves the resistance weldability.

FIGS. 6a and 6b are front and sectional views of a first electrode tab according to another embodiment of the present invention.

Referring to FIGS. 6a and 6b, the first electrode tab 217c has an embossing plate 282c attached thereto. Protrusions 280c are formed on the embossing plate 282c. The embossing plate 282c is a thin plate and has at least two embossings 284c formed on the surface thereof linearly or in a matrix shape. The embossings 28c preferably have a width of 1.0 mm or less. The spacing between each embossing 284c is preferably at least 1.0 mm. The embossing plate 282c is preferably of a metal, such as an invar a nickel-steel alloy, having a higher electrical resistance than a nickel-based metal. However, the type of metal is not limited thereto. When the embossing plate 282c is of a metal having a higher electrical resistance than the nickel-based metal which constitutes the terminal plate 260, the contact resistance further increases when the embossing plate 282c and the terminal plate 260 contact each other. This improves the resistance weldability. The embossing plate 282c is preferably attached to the first electrode tab 217c by welding, soldering, or gluing.

Although the present invention has been described with reference to embodiments of the first electrode tab 217 having a protrusion 280 formed thereon, the second electrode tab 216 can also have a second protrusion formed thereon in the same shape as the protrusion 280. In this case, the contact area decreases when the second electrode tab 217 is welded to the cap plate 240. This increases the electrical resistance and improves the weldability.

The operation of the secondary battery according to the present invention is as follows.

FIG. 7 is a front view of a secondary battery having a first electrode tab, which has protrusions formed thereon, welded to a terminal plate according to an embodiment of the present invention.

The first electrode tab 217 has protrusions 280 formed on a surface thereof which contacts the terminal plate. The protrusions 280 are welded to the terminal plate 260 and are electrically connected thereto. The first electrode tab 217 and the terminal plate 260 are attached to each other by resistance welding. The contact area between the first electrode tab 217 and the terminal plate 260 is reduced by the protrusions 280. This increases the contact resistance in the contact region. As such, the resistance welding between the first electrode tab 217 and the terminal plate 260 can be performed more easily.

The second electrode tab 216 can also have second protrusions 290 formed thereon in the same shape as the protrusions 280 formed on the first electrode tab 217 to be welded to the cap plate 240.

After the terminal plate 260 and the first electrode tab 217 are welded to each other, the second electrode tab 216 and the cap plate 240 are welded to each other. The cap assembly 220 is assembled to the top opening 210a of the can 210 by bending the first and second electrode tabs 217 and 216 in a predetermined position with an angle of 90°.

If the protrusions 280 are composed of conductive tips or conductive embossing plates of a metal having a higher electrical resistance than a nickel-based metal, the contact resistance between the terminal plate 260 and the first electrode tab 217 increases and the weldability improves.

According to the inventive secondary battery, the first electrode tab having protrusions formed thereon and the terminal plate contact each other and the contact area between them decreases. This increases the contact resistance and improves the resistance weldability between them.

In addition, the increase in the contact resistance between the terminal plate and the first electrode tab makes it possible to avoid welding the first electrode tab to the welding rod.

Although exemplary embodiments of the present invention have been described for illustrative purposes, those skilled in the art will appreciate that various modifications, additions and substitutions are possible, without departing from the scope and spirit of the invention as recited in the accompanying claims.

What is claimed is:

1. A secondary battery, comprising:
   an electrode assembly having first and second electrode plates, a separator, and first and second electrode tabs respectively attached to the first and second electrode plates; and
   a cap assembly having a cap plate, an electrode terminal, and a terminal plate; and
   a first embossing plate arranged between the first electrode tab and the terminal plate, the first embossing plate having at least two protrusions arranged thereon to facilitate resistance welding the first electrode tab to the terminal plate, the first embossing plate being comprised of a metal different from that of the first electrode tab.

2. The secondary battery of claim 1, wherein the first electrode plate comprises a negative electrode plate and the first electrode tab comprises a negative electrode tab.

3. The secondary battery of claim 1, wherein each protrusion comprises a circular, an elliptical, or a polygonal shape.

4. The secondary battery of claim 1, wherein each is smaller than a welding nugget formed when the first electrode tab is resistance welded to the terminal plate.

5. The secondary battery of claim 1, wherein each protrusion is smaller than 30% of the width of the first electrode tab.

6. The secondary battery of claim 1, wherein each protrusion is smaller than 20% of the width of the first electrode tab.

7. A secondary battery, comprising:
- an electrode assembly having first and second electrode plates, a separator, and first and second electrode tabs respectively attached to the first and second electrode plates, the first electrode tab being comprised of a nickel-based metal;
- a cap assembly having a cap plate, an electrode terminal, and a terminal plate, the terminal plate being comprised of a nickel-based metal; and
- at least two conductive tips arranged between the first electrode tab and the terminal plate, the at least two conductive tips comprise a metal that is different from that of the first electrode tab to facilitate resistance welding the first electrode tab to the terminal plate, wherein each of said conductive tips are spaced apart from each other by at least 1.0 mm.

8. The secondary battery of claim 7, wherein the conductive tips are comprised of a metal having a higher electrical resistance than that of the first electrode tab.

9. The secondary battery of claim 7, wherein the conductive tips are comprised of a nickel-steel alloy.

10. The secondary battery of claim 7, wherein the conductive tips have a width of 1.0 mm or less.

11. The secondary battery of claim 1, wherein the first embossing plate comprises a metal having a higher electrical resistance than that of the terminal plate.

12. The secondary battery of claim 1, wherein the first embossing plate is comprised of a nickel-steel alloy and the terminal plate is comprised of a nickel-based metal.

13. The secondary battery of claim 1, wherein each protrusion of the first embossing plate has a diameter of 1.0 mm or less and each protrusion is spaced apart from each other by at least 1.0 mm.

14. The secondary battery of claim 1, further comprising a second embossing plate arranged between the second electrode tab and the cap plate, the second embossing plate having at least two protrusions, the second embossing plate is comprised of a different material than that of the second electrode tab.

15. The secondary battery of claim 12, wherein the first electrode tab is comprised of a nickel-based metal.

16. A secondary battery, comprising:
- an electrode assembly having first and second electrode plates, a separator, and first and second electrode tabs respectively attached to the first and second electrode plates; and
- a cap assembly having a cap plate, an electrode terminal, and a terminal plate; and
- a first embossing plate arranged between the first electrode tab and the terminal plate, the first embossing plate having at least two protrusions arranged thereon, the first embossing plate being comprised of a different material from that of the first electrode tab.

17. The secondary battery of claim 16, the first embossing plate being comprised of a metal having a lower conductivity than that of the first electrode tab.

18. The secondary battery of claim 16, the first electrode tab and the terminal plate each being comprised of a nickel-based metal and the first embossing plate being comprised of a nickel-based alloy.

19. The secondary battery of claim 16, further comprising a second embossing plate arranged between the second electrode tab and the cap plate, the second embossing plate comprising at least two protrusions, the second embossing plate being comprised of a material having a higher resistivity than that of the second electrode tab.

20. The secondary battery of claim 19, the second electrode tab being comprised of a nickel-based metal and the second embossing plate being comprised of a nickel-based alloy.

* * * * *